Oct. 22, 1957      H. W. BURDETT, JR      2,810,259
INJECTOR FOR REACTION MOTOR

Filed April 4, 1956      2 Sheets-Sheet 1

INVENTOR.
HARRY W. BURDETT, JR.
BY
AGENT

United States Patent Office 2,810,259
Patented Oct. 22, 1957

2,810,259

INJECTOR FOR REACTION MOTOR

Harry W. Burdett, Jr., Wyckoff, N. J., assignor to Reaction Motors, Inc., Denville, N. J., a corporation of New Jersey Application April 4, 1956, Serial No. 576,007

6 Claims. (Cl. 60—35.6)

The present invention relates to reaction motors of the liquid propellant rocket type and, in particular, to a device for the admission of propellants to the combustion chamber of such a reaction motor. The present invention relates more particularly to such a device which is both capable of controlling the quantity of propellants entering the combustion chamber and of acting as a valve to shut off the propellant flow completely.

In a reaction motor of the liquid propellant rocket type, control of the thrust output of the motor is largely dependent upon the amount of propellant or propellants allowed to flow to the combustion chamber of the motor. It has been difficult, prior to the present invention, to achieve this purpose in a practical manner due to the exceedingly high temperatures present in the combustion chamber which produces great distortion of the parts as the metal parts of the propellant admission device as the parts expand excessively and unevenly with the high temperatures, thus preventing proper operation. In the present invention, means is provided for cooling the portions of the injector which are most exposed to the high temperature conditions so that expansion of the parts is minimized and made more even so that distortion is not present in sufficient degree to cause malfunctioning.

In an injector head for a liquid propellant reaction motor, it is also advantageous to prevent propellants from leaking into the combustion chamber of the motor during periods when the motor is not in operation so that an accumulation of residual propellants from the injector cannot occur within the motor. Such an accumulation is to be avoided since it can result in explosions, constitutes a fire hazard and is wasteful of propellants. In the present invention, means is provided to shut off completely even residual propellant flow during periods when the motor is not in operation.

It is, therefore, an object of the present invention to provide an injector for a reaction motor in which the quantity of propellant or propellants flowing into the motor's combustion chamber may be controlled or shut off immediately prior to entry into the combustion chamber of the motor.

It is also an object of the present invention to provide an injector for a reaction motor wherein portions of the injector act to seal off the injector passages from the combustion chamber to prevent accumulation of propellants within the chamber.

It is also an object of the present invention to provide an injector of the kind set forth in the preceding objects with provision for cooling of the injector in a regenerative manner by circulation of the propellant or propellants through the critically hot portions of the injector prior to entry into the combustion chamber.

It is also an object of the present invention to provide an injector for a reaction motor of the foregoing type which provides for an even distribution of propellant over the injector face.

Other objects and advantages of the present invention will be apparent from the detailed description which follows.

The present invention comprises in general, a sliding piston of annular form which uncovers ports in a suitable wall to allow a liquid propellant or propellants to flow through the ports into the combustion chamber of a reaction motor, cooperating valve seats on the piston and head adjacent the motor's combustion chamber, and a suitable means for causing movement of the piston, preferably from a remote location. The invention is described in detail in the paragraphs which follow.

Figure 1:
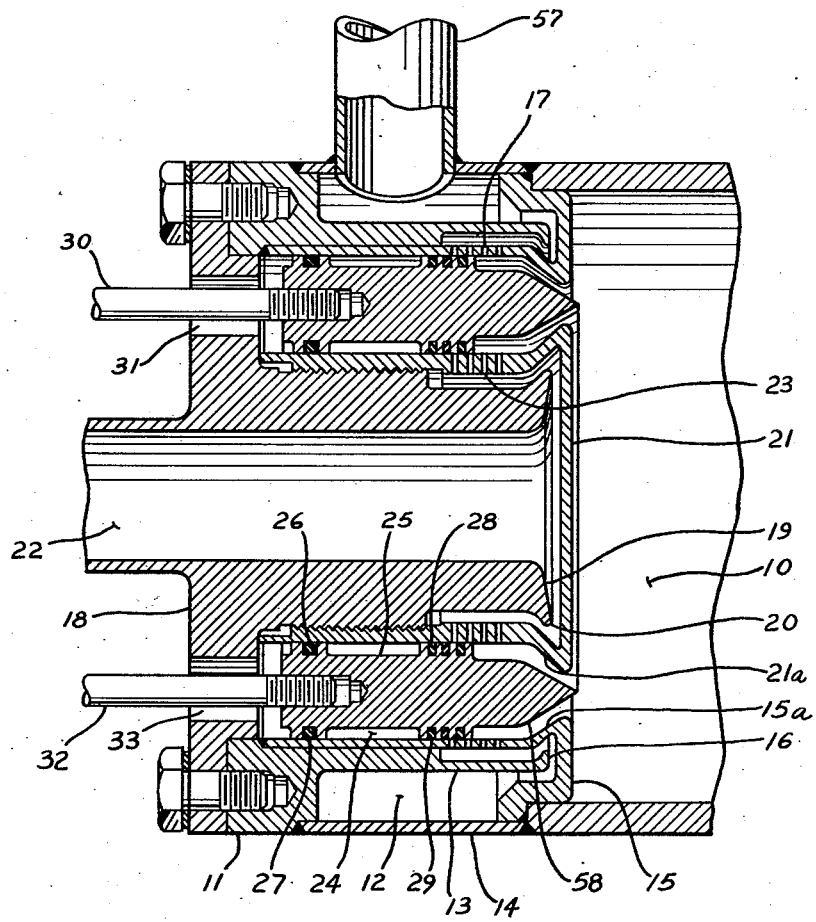
Figure 1 is a cutaway cross-sectional view of the head or injector end of a reaction motor showing the interior arrangement of the injector.

With reference to Figure 1, a reaction motor combustion chamber 10 is attached to annular outer member or annulus 11 into which is formed annular chamber 12 and annular coolant baffle 13. An annular jacket 14 surrounds chamber 12 and defines chamber 12 as a fluid-tight passage for coolant. A baffle 13 of annular form and integral with member 11 extends toward the combustion chamber and defines an extension of coolant passage 12 between it and annular jacket or head surface 15 in the manner shown. The extension of passage 12 therefore follows along the outer side of baffle 13 around its end, up and around lip 16 of baffle 13 and along baffle 13 between it and jacket 15 to ports or orifices 17. Ports 17 extend clear through jacket 15 to allow propellant to flow therethrough. A central member or core 18 is attached to member 11 and extends inwardly toward the combustion chamber 10, the end of member 18 adjacent to the combustion chamber being formed in the shape of a baffle 19 having an outwardly flared lip 20. A jacket 21 surrounds member 18 and is attached thereto and is spaced from baffle 19 and lip 20 to form an annular passage between them and jacket 21. A central passage is provided in member 18 and it extends around baffle 19 and lip 20 and communicates with ports 23 in the wall of jacket 21 as shown in Figure 1. Ports 23 extend through jacket 21 to provide for the passage of propellant therethrough.

Jackets 21 and 15 are flared toward one another at their faces, or surfaces adjacent to the combustion chamber 10, in order to form annular lips or valve seats 15a and 21a. The portions of jackets 15 and 21 which extend back along part 11 and central member 18 have facing parallel annular surfaces defining an annular chamber for slot 24. Disposed in slot 24 is a piston 25 annular in form and having an annular valve seat 25a on its end nearest the combustion chamber 10 of a substantially V-shaped cross-section to co-operate with the valve seats 15a and 21a of jackets 15 and 21. Piston 25 is slidable in slot 24 in sealing relationship to the walls thereof, the seals being provided as resilient O rings or gaskets 26, 27, 28 and 29. Piston rods 30 and 32 are attached to piston 25 and extend outward away from combustion chamber 10 through member 18 through holes 31 and 33 provided for that purpose. Piston 25 is so proportioned and dimensioned that as it is slid all the way to the right in Figure 1, the co-operating valve seats will be engaged to create a substantially fluid-tight closure and piston 25 will completely close and block ports 17 and 23. As piston 25 is moved toward the left in Figure 1 it will move away from the valve seats 15a and 21a and will uncover ports 19 and 23 successively or progressively because of their longitudinal arrangement along the wall of the slot.

The assemblage of parts described in the preceding paragraphs comprises a head for the combustion chamber with an annular slot therein and a piston in the slot slidable to cover or uncover ports in the walls of the slot leading to propellant coolant passages.

Figure 2:
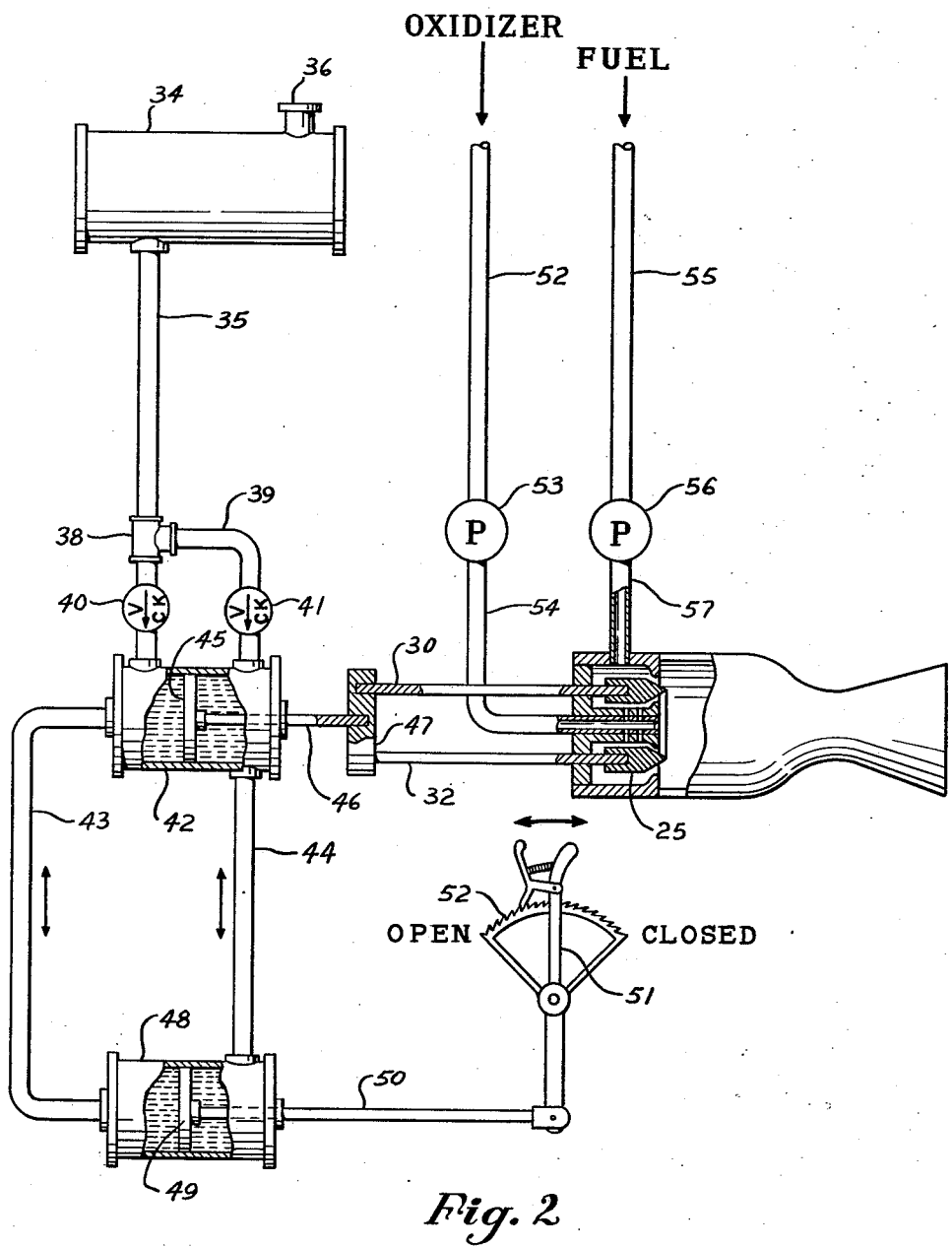
Figure 2 is a schematic view of the hydraulic mechanism used to control the extent of the opening of the injector.

Piston 25 is moved by any suitable means attached to piston rods 30 and 32. A typical hydraulic system for this purpose showing a remote control handle and a hydraulic control system is shown in Figure 2. This system comprises a supply tank 34 for hydraulic fluid, a pipe or conduit 35 connecting the tank 34 with T connection 38, one branch of which leads to check valve 40 and another branch of which leads through pipe 39 to check valve 41. Check valves 40 and 41 both allow free flow only in a direction away from the tank. Check valves 40 and 41 communicate with hydraulic cylinder 42, and pipes 43 and 44 communicate with the interior of opposite ends of hydraulic cylinder 42 and at their other ends communicate with opposite ends of the interior of hydraulic cylinder 48. A piston 45 is located in hydraulic cylinder 42 and is slidable therein with piston rod 46 attached to piston 45 and passing through one end of cylinder 42. Rod 46 is attached at its other end to yoke 47 which is in turn attached to piston rods 30 and 32, these being connected at their opposite ends to piston 25 of the rocket motor injector. Piston 49 is located in hydraulic cylinder 48 and is slidable therein, and to piston 49 is attached piston rod 50 which passes out of one end of cylinder 48 and is attached at its opposite end to pivoted operating lever 51. Lever 51 operates on a ratchet quadrant 52 so that it may be set and retained in any particular position.

Oxidizer is supplied to the motor from a supply source through pipe 52 to pump 53. Pump 53 pumps oxidizer through pipe 54 into the reaction motor through the injector. Fuel is supplied to the motor from a supply source through pipe 55 to pump 56 from which it is pumped through pipe 57 into the reaction motor through the injector through passage 12.

The hydraulic control system operates in the following manner. Hydraulic fluid from tank 34 flows under the force of gravity through pipe 35, T connection 38, pipe 39, and check valves 40 and 41 into the interior of hydraulic cylinder 42, filling the space on opposite sides of piston 45. Hydraulic fluid will also fill the system comprising pipes 43 and 44 leading from cylinder 42 into the interior of cylinder 48 on opposite sides of piston 49. With the system in this condition, control handle 51 is moved to any appropriate location thereby moving piston rod 50 and its attached piston 49 and thus forcing hydraulic fluid, from the side of piston 49 having the reduced volume, through pipe 43 or 44, as the case may be, to the appropriate side of piston 45 in cylinder 42. Fluid from the opposite side of piston 45 and cylinder 42 will be forced from cylinder 42 through pipe 43 or 44, as the case may be, into cylinder 48 to fill the volume vacated by the piston 49 as it moves. This action will cause piston 45 to slide in cylinder 42 and thus move piston rod 46 and its attached yoke 47, piston rods 30 and 32, and piston 25 of the injector. If this action of piston 45 is to the left in Figures 1 and 2, piston 25 will move away from its valve seats 15a and 21a, thus opening the injector to combustion chamber 10 of the reaction motor. As piston 25 continues to move to the left as control handle 51 is moved toward the open position in Figure 2, piston 25 will successively or progressively uncover ports 17 and 23 and oxidizer and fuel will be allowed to flow through their respective ports in increasing amounts as the greater port area is uncovered. All ports, or the entire port area, will have been uncovered by the time piston 25 reaches the full extent of its travel. If control handle 51 is moved in the opposite direction, toward the "closed" position, piston 25 will then move back toward valve seats 15a and 21a, i. e. toward combustion chamber 10, and will successively or progressively close off ports 17 and 23, thereby gradually shutting down the propellant flow to the combustion chamber. As piston 25 continues its travel, it will finally engage the valve seats 15a and 21a and will thereby shut off the injector from the inside of combustion chamber 10, completely stopping the flow of propellants including the residual propellant which might be trapped between ports 17 and 23 and combustion chamber 10.

The liquid propellants, such as a liquid hydrocarbon, ammonia or other liquid fuel, and a liquid oxidizer such as fuming nitric acid, mixed acid or the like enter the injector head through passages 22 and 12 and their extensions. The propellant entering the injector head through pipe 57 will pass through annular chamber 12 and its extensions around baffle 13 and lip 15 to ports 19 in jacket 15, thus effectively cooling those faces of jacket 15 exposed to the heat of combustion in combustion chamber 10. The heat absorbed by the coolant is carried with the fuel into the combustion chamber 10 to cause a regenerative effect. The liquid propellant entering the injector head through pipe 54, passes through passage 22 around baffle 19 and lip 20 to ports 23 in jacket 21 thus effectively cooling the walls of jacket 21 where they are exposed to the heat of combustion in combustion chamber 10, and again accumulating heat to be carried with the propellant into combustion chamber 10 to give a regenerative effect. The liquid propellants entering through ports 17 and 23, under a pressure greater than that in combustion chamber 10 and created by pumps 53 and 56, strike against the extended or forward portion 58 of piston 25 and flow past the annular convergent end of piston 25 adjacent the combustion chamber 10 at considerable velocity and with a very effective mixing effect. The injected propellants are well distributed over the face of the injector because of the annular form of the injection slot and are well intermingled as they enter combustion chamber 10 in this annular pattern.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A propellant injector for a reaction motor having a combustion chamber, said injector comprising a head having at least one side exposed to the combustion chamber, an annular slot in said head in communication with the combustion chamber, an annular piston axially slidable in said slot in sealing relationship thereto, ports in the wall of said annular slot longitudinally arranged so as to be progressively uncovered by said piston as it slides in said slot in a direction away from said combustion chamber and progressively covered by said piston as it slides toward said combustion chamber, means for supplying at least one propellant to said ports under a pressure greater than that existent in the combustion chamber, and means for moving said piston in said slot.

2. The invention set forth in claim 1 with an annular valve seat on the end of the piston nearest the combustion chamber, a co-operating valve seat at the periphery of said slot adjacent the combustion chamber, and means for moving said valve seats into engagement.

3. The invention set forth in claim 2 with said last-named means comprising the means for moving the piston in the slot.

4. The invention set forth in claim 2 with the valve seat end of the piston elongated into the form of a baffle for the propellant emerging from the said ports.

5. The invention set forth in claim 1 with coolant passages in said head adjacent those surfaces of said head exposed to the combustion chamber and surrounding at least a portion of said slot, and means for circulating a coolant therethrough.

6. The invention set forth in claim 5 with the said coolant passages in communication with said ports and comprising the propellant passages thereto.

References Cited in the file of this patent

UNITED STATES PATENTS

| | | |
|---|---|---|
| 2,409,036 | Goddard | Oct. 8, 1946 |
| 2,637,973 | Lawrence | May 12, 1953 |